United States Patent [19]
Bertrand et al.

[11] Patent Number: 5,450,650
[45] Date of Patent: Sep. 19, 1995

[54] PIVOTING CASTOR WITH DIRECTIONAL LOCKING

[75] Inventors: Claude Bertrand; Jean Hrabina, both of Aulnay Sous Bois, France

[73] Assignee: Guitel-Etienne Mobilor, Le Pre Saint Gervais, France

[21] Appl. No.: 217,535

[22] Filed: Mar. 24, 1994

[30] Foreign Application Priority Data

Mar. 30, 1993 [FR] France ................. 93 03650

[51] Int. Cl.$^6$ ............................................. B60B 33/02
[52] U.S. Cl. ................................................ 16/35 R
[58] Field of Search ........................... 16/35 R, 35 D

[56] References Cited

U.S. PATENT DOCUMENTS

| | | | |
|---|---|---|---|
| 2,583,858 | 2/1949 | Kostolecki | 16/35 R |
| 2,799,514 | 7/1957 | Kramczak | |
| 3,751,757 | 8/1973 | Stosberg et al. | 16/35 |
| 4,494,272 | 1/1985 | Morita | 16/35 R |
| 4,706,328 | 11/1987 | Broeske | 16/35 R |
| 5,040,265 | 8/1991 | France et al. | 16/35 R |
| 5,263,226 | 11/1993 | Roy et al. | 16/35 R |

FOREIGN PATENT DOCUMENTS

| | | | |
|---|---|---|---|
| 0352380 | 3/1990 | European Pat. Off. | B60B 33/02 |
| 0370716A1 | 5/1990 | European Pat. Off. | B60B 33/02 |
| 2488190 | 12/1982 | France | B60B 33/02 |
| 3525443A1 | 1/1987 | Germany | B60B 33/02 |
| 55-156702 | 12/1980 | Japan | B60B 33/00 |
| 58-218402 | 12/1983 | Japan | B60B 33/00 |
| 7613360 | 6/1978 | Netherlands | 16/35 R |
| 2090126 | 7/1982 | United Kingdom | B60B 33/02 |
| WO91/05672 | 5/1991 | WIPO | B60B 33/02 |

*Primary Examiner*—S. Thomas Hughes
*Assistant Examiner*—Kenneth J. Hansen
*Attorney, Agent, or Firm*—Pennie & Edmonds

[57] ABSTRACT

A pivoting castor having a rotating wheel able to pivot about a vertical pivot shaft. The castor includes a support bearing structure fixed to the lower end of the pivot shaft and supporting a fork joint the lower end of which supports the wheel. A locking mechanism including a spring strip member is disposed in a space between the support bearing and the wheel and is pivoted on the fork joint. The spring strip member includes a locking bolt which is able to engage in a recess provided in the support bearing structure for locking the wheel against pivoting about the pivot shaft.

13 Claims, 7 Drawing Sheets

PIVOTING CASTOR WITH DIRECTIONAL LOCKING

FIELD OF THE INVENTION

The present invention relates to a pivoting castor comprising a wheel able to pivot about a vertical pivot shaft substantially at right angles to the rotation pin of the wheel and offset with respect to the latter, a support bearing comprising at least one annular cup which by its central part is fixed to the lower end of said pivot shaft, a support fork joint comprising at least one lateral member whereof the lower end supports said wheel and also comprising a skirt disposed around said lower end of the pivot shaft, said skirt being connected to the upper end of said member and cooperating with ball bearings of said bearing, and means for locking the pivoting of said wheel with respect to said pivot shaft in at least one predetermined position, said locking means comprising a spring strip.

BACKGROUND OF THE INVENTION

A castor of the type described above is known in particular from the French document A-80.17455 which provides a spring strip which is curved and fixed by one end to a first part of the castor and whereof the other end forms a locking tenon intended to engage in a recess provided on a second part of the castor which is able to pivot with respect to the first part. If the fixing of the spring strip is released, the locking means no longer fulfil their function locking the pivoting movement.

EP 0 370 716, U.S. Pat. No. 4,494,272 and Japanese Patent Application 54-63958 published under Number 55 156 702 also disclose castors comprising locking means able to lock the pivoting of the fork joint by rotation of the wheel in one direction and to release the pivoting of the fork joint by rotation of the wheel in the other direction. These means necessitate a reverse rotation of the wheel to unlock the device and they comprise movable components actuated by the rotation of the wheel and are subject to fouling and wear due to friction against the wheel.

SUMMARY OF THE INVENTION

The object of the present invention is to obviate the drawbacks of the prior constructions described above.

The object is achieved according to the invention by the fact that the spring strip is disposed in the space comprised between the support bearing and the tread of the wheel and is pivoted by its central part on the fork joint, said spring strip comprising a first end bearing against the skirt and a second end comprising a locking bolt able to engage in a recess provided on the annular cup.

In order to allow accuracy in the direction of the castor in the locked position, the skirt comprises means for guiding the locking bolt. These guide means advantageously comprise a notch provided in the skirt.

This arrangement makes it possible to avoid a deformation of the spring strip by torsion when a rotary torque is exerted on the fork joint or the pivot shaft subsequent to the offset of the wheel with respect to the pivot shaft.

According to a first embodiment, the spring strip is mounted on the fork joint by means of a pivot pin arranged parallel to the rotation pin of the wheel.

According to one variation, the pivot pin is mounted to pivot on the fork joint and it comprises at least one cam on which the spring strip is pivoted, in order to enable the locking means to be put out of operation.

According to a second embodiment, the spring strip comprises lateral tabs comprising lugs cooperating with openings provided in the fork joint.

Advantageously, the locking bolt is pressed by the spring strip against the free edge of the annular cup and at least one blocking recess is provided in said free edge.

Preferably, the recess comprises inclined ramps in order to allow the unlocking of the pivoting of the wheel by a rotary torque exerted on the fork joint or on the pivot shaft. The bolt may be of spherical, cylindrical or angular shape, the value of the angles acting on the operating flexibility of the mechanism. The recess has a shape corresponding to that of the bolt. It may be made from different materials for example plastics material, composite material, metal, ceramic material or other materials. The choice of the material makes it possible to obtain the minimum friction of the bolt on the free edge of the annular cup and to minimize the phenomena of wear. It may be fixed to the spring strip by ratchet motion, overmolding, covering or any other assembly or connection means.

In another variation, the spring strip comprises, at its second end, a pedal able to be operated by the user for unlocking the pivoting of the wheel.

According to a particularly advantageous embodiment, the bolt forms an integral part of the spring strip and is formed in the wall of the latter.

Preferably, in addition the castor comprises means for adjusting the force exerted by the spring. These means advantageously comprise an adjusting screw cooperating with the skirt of the support fork joint.

BRIEF DESCRIPTION OF THE DRAWINGS

Further features and advantages of the invention will become apparent on reading the ensuing description given by way of example and with reference to the accompanying drawings in which.

Figure 1:
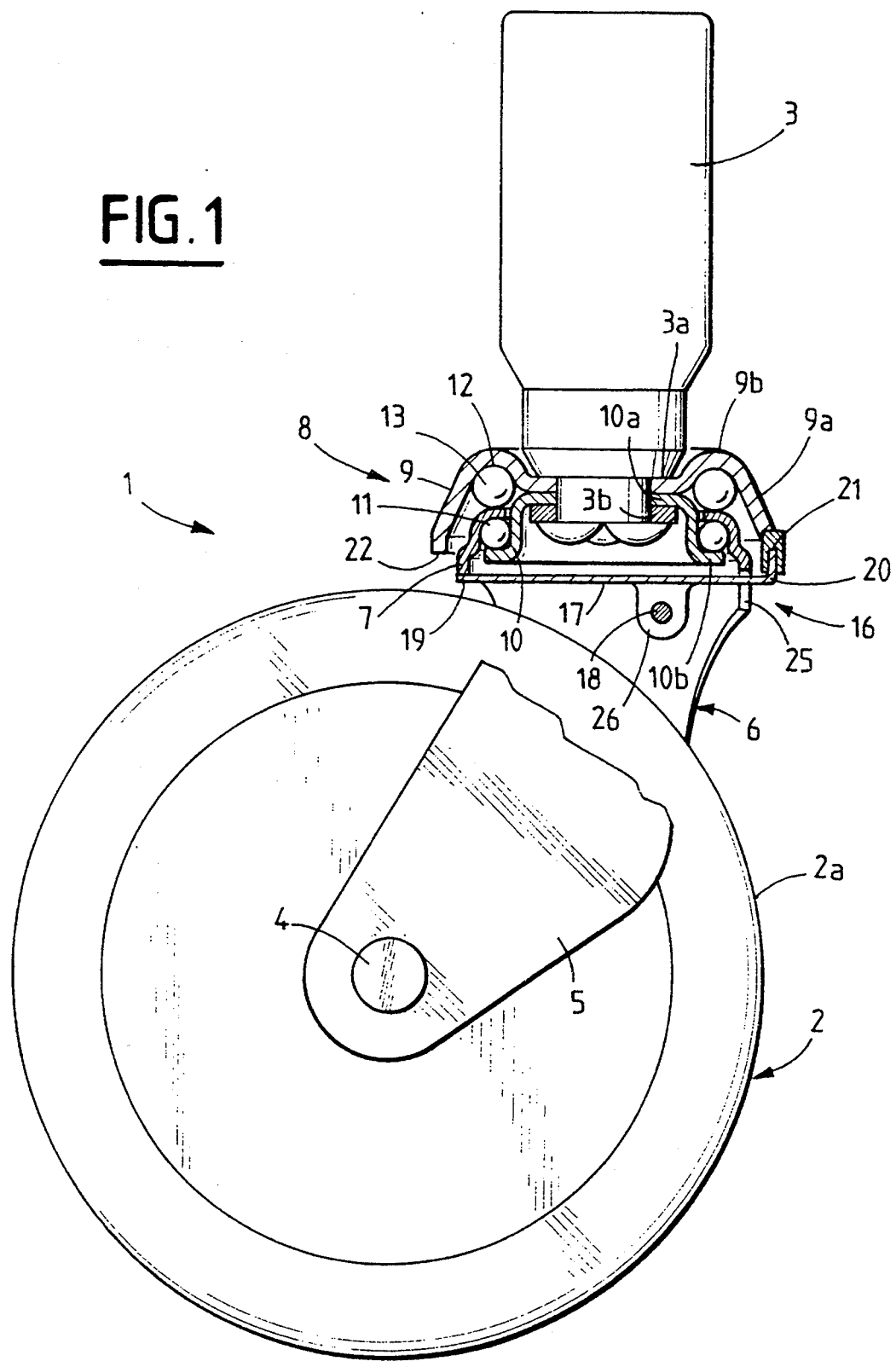
FIG. 1 is a view in elevation and in partial vertical section of a castor provided with locking means according to the invention, according to a first embodiment.

The castor 1 shown in the drawings comprises a wheel 2 which is able to pivot about a vertical pivot shaft 3 substantially at right angles to the horizontal rotation pin 4 of the wheel 2. The ends of the rotation pin 4 are supported by at least one lateral member, and preferably two lateral members 5 of a fork-joint 6 whereof the upper part is in the form of a skirt 7 mounted by means of a support bearing 8 on the lower end of the vertical pivot shaft 3.

In the present description, the term pivot shaft is intended to mean any rod or plate intended for fixing the castor to a carriage or other movable platform not shown in the drawing.

As can be seen from the drawings, the support bearing 8 comprises a first annular cup 9 and a second annular cup 10 fixed like the first, rigidly to the lower end of the pivot shaft 3. The two cups 9 and 10 are open on the underside. The first cup 9 is disposed above the second cup 10 and has a bell-shaped outer skirt 9a, to which there is connected at the top, an inverted annular base 9b which, in the inner opening area rests on the annular base 10a of the lower cup 10. The two cups 9, 10 are fixed to the pivot shaft 3 and are enclosed by their inner edges between two annular shoulders 3a, 3b of the vertical shaft 3. At its lower end, this lower cup 10 has an annular flange 10b, which, by way of its upper side, serves as a ball race for a first series of ball bearings or similar members 11 on which the skirt 7 of the support fork-joint 6 rests. In the annular junction area between the bell 9a and the annular base 9b, the upper cup 9 defines a ball race in the form of a groove 12, in which is housed a second series of ball bearings 13 resting on the upper side of the skirt 7. The outer cup 9 surrounds and covers the skirt 7 and the lower cup 10.

The pivoting castor 1 also comprises means 16 for locking the fork joint 6 at least in one predetermined direction with respect to the pivot shaft 3.

Figure 2:
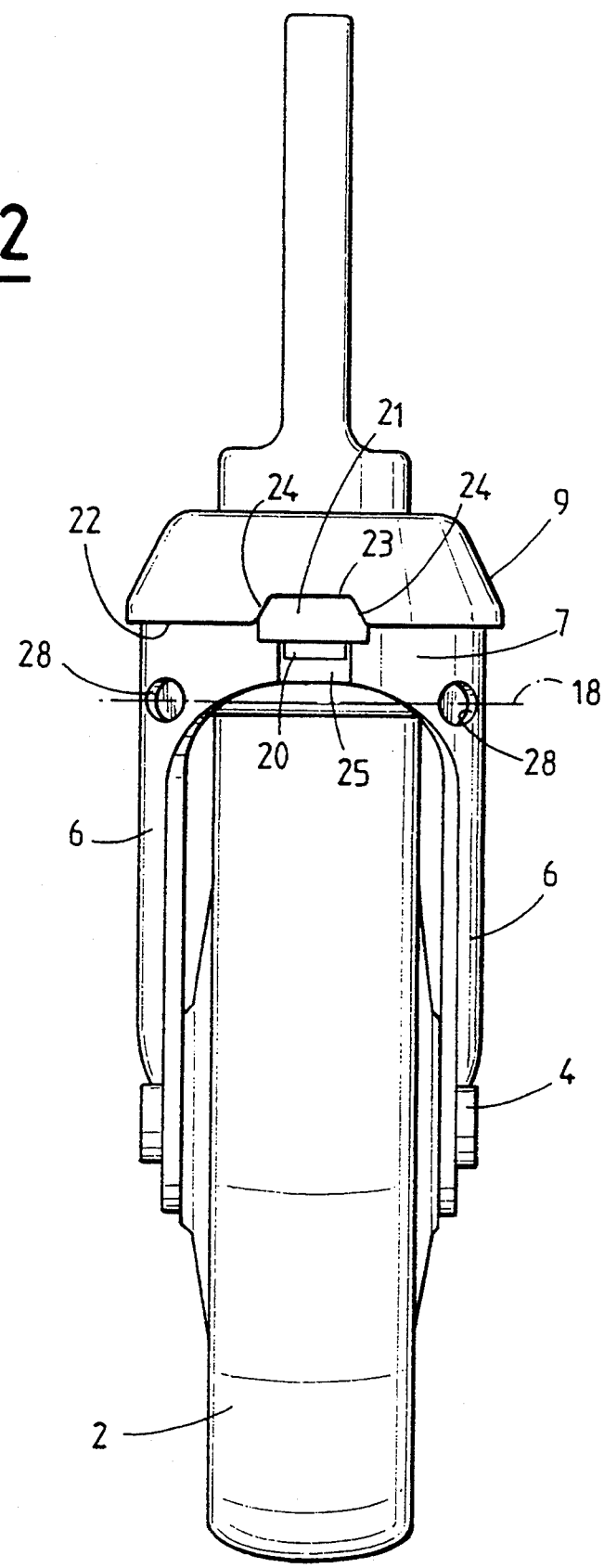
FIG. 2 is a rear view of the castor of FIG. 1.

According to the embodiment illustrated in FIGS. 1 and 2, the locking means 16 comprise a spring strip 17 of generally flat shape and which is disposed between the support bearing 8 and the tread 2a of the wheel 2. The spring strip 17 is pivoted by its central part on the fork joint 6 by means of a pivot pin 18 extending substantially parallel to the rotation pin 4 of the wheel 2. A first end 19 of the spring strip 17 bears against the lower edge of the skirt 7 whereas its other end 20 comprises a locking bolt 21 which is kept in abutment with the free lower edge 22 of the upper cup 9. This edge 22 comprises at least one irregularity in the form of recess 23 adapted to the shape of the locking bolt 21 and constructed in the form of a notch having inclined lateral ramps 24, in order to allow the unlocking of the pivoting of the wheel 2 by exerting a rotary torque on the fork joint 6 or the pivot shaft 3.

In the vicinity of the locking bolt 21, the skirt 7 comprises a notch 25 of rectangular shape intended to guide the end 20 of the spring strip 17. This notch 25 is open on the lower edge of the skirt 7. On its longitudinal edges, the spring strip 17 comprises tabs 26 in which openings are provided for the passage of the pivot pin 18. In FIG. 2, the pivot pin 18 is not shown for the sake of clarity of the drawing.

Figure 3:
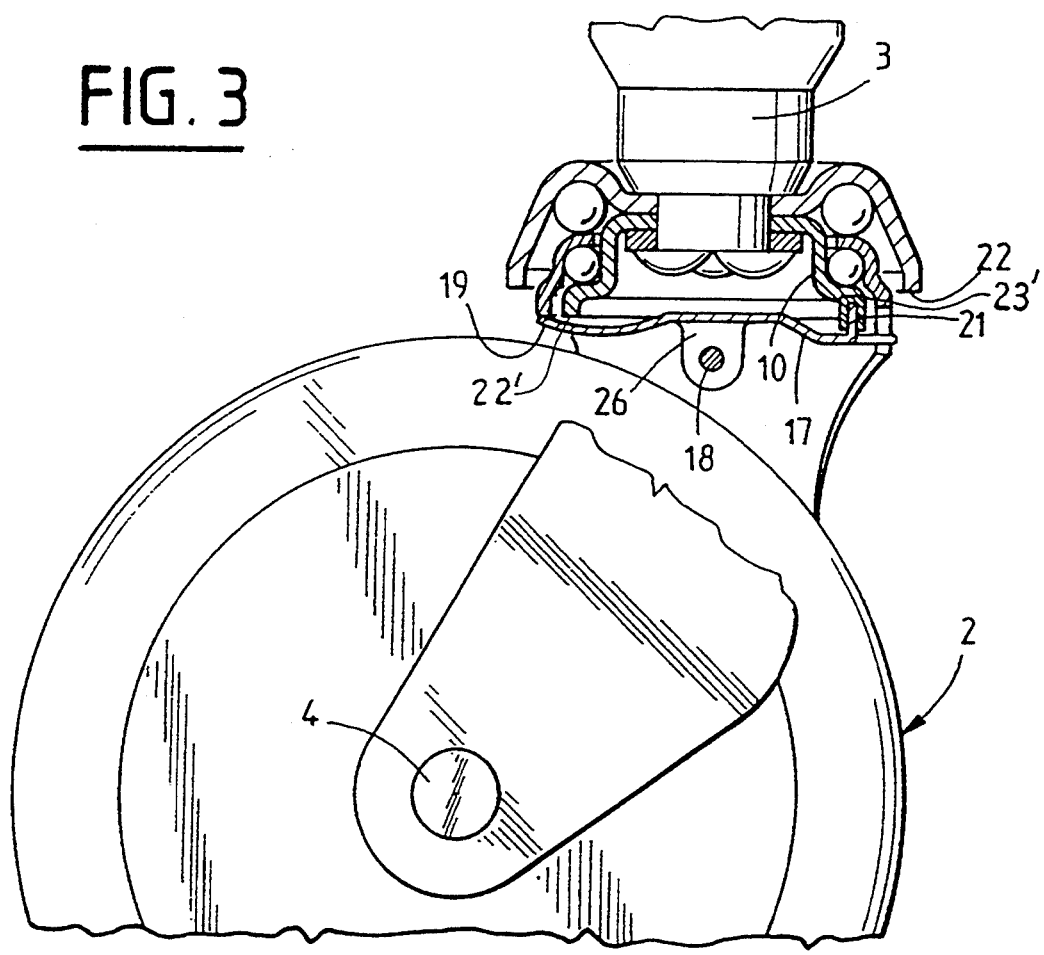
FIG. 3 shows a variation of the embodiment of FIG. 1.

The embodiment illustrated in FIG. 3 is similar to the embodiment illustrated in FIGS. 1 and 2 apart from the fact that the locking bolt 21 cooperates with a recess 23' provided in the free lower edge 22' of the lower cup 10.

Figure 4A:
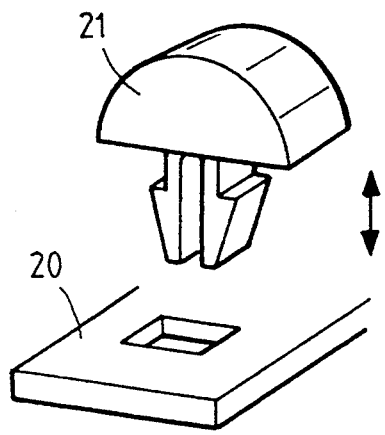
FIGS. 4A to 4E show different embodiments of the locking bolt.
Figure 4B:
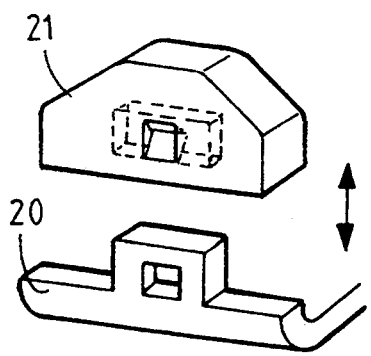
Figure 4C:
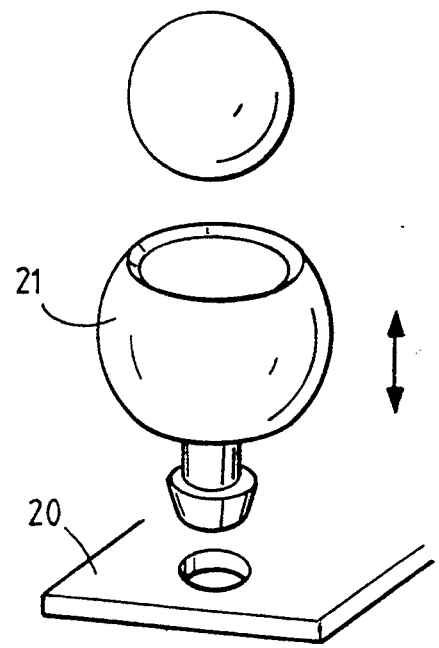
Figure 4D:
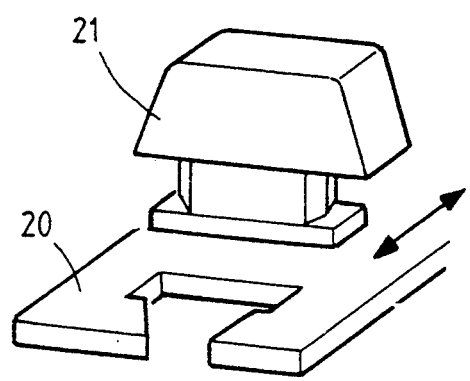
Figure 4E:
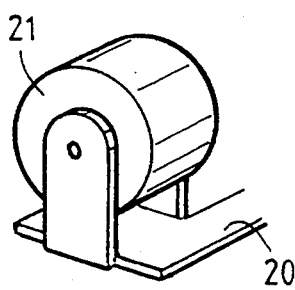
Figure 5:
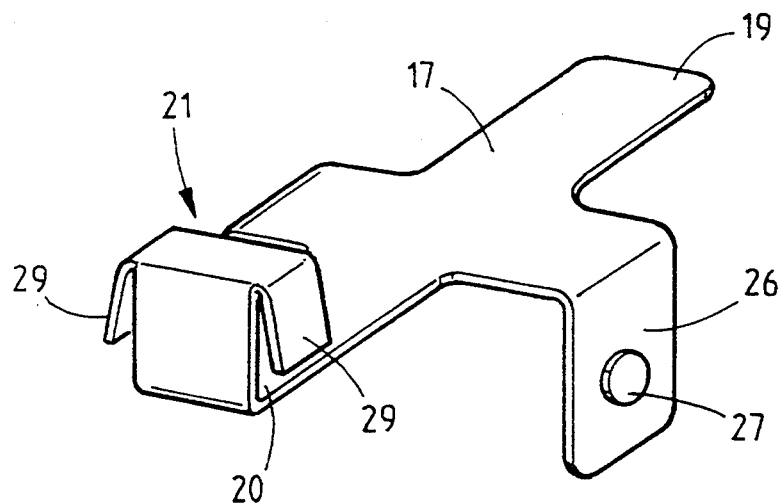
FIG. 5 shows a second particularly advantageous embodiment of the means for locking the pivoting of the castor.
Figure 5A:
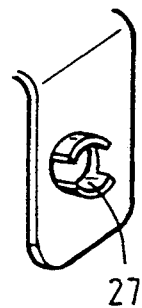
FIGS. 5A to 5C show variations of the means for fixing the spring strip to the side plate.
Figure 5B:
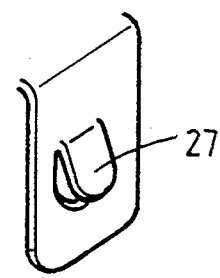
Figure 5C:
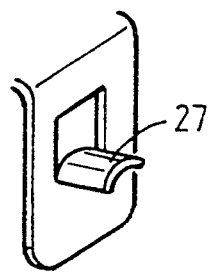

FIGS. 4A to 4D show several embodiments of the locking bolt 21. The bolt may be made from different materials. The choice of the material makes it possible to obtain minimum friction of the bolt 21 on the cup 9 or 10 when in use and to minimize the phenomena of wear. The preferred materials are plastics material, composite materials, or ceramic material, even metal. The bolt 21 may be of spherical, cylindrical or angular shape. The value of the angles acts on the operating flexibility of the bolt. It may be fixed to the spring strip by a ratchet motion, over-molding, covering or any other assembly or connection means. FIG. 4E shows a locking bolt 21 in the form of a roller which is able to roll on the lower edge 22 of a cup 9 or 10 of the bearing 8.

FIG. 5 and 5A–5C show a particularly advantageous embodiment of the locking means 16, which are made in only one piece by cutting-out and folding of a spring strip 17. The tabs 26 comprise lugs 27 able to cooperate with the walls of the openings 28 provided in the fork joint 6. The locking bolt 21 is formed by inclined tabs 29 whereof the angle of inclination is substantially equal to the slope of the ramps 24 of the recess 23.

Figure 6:
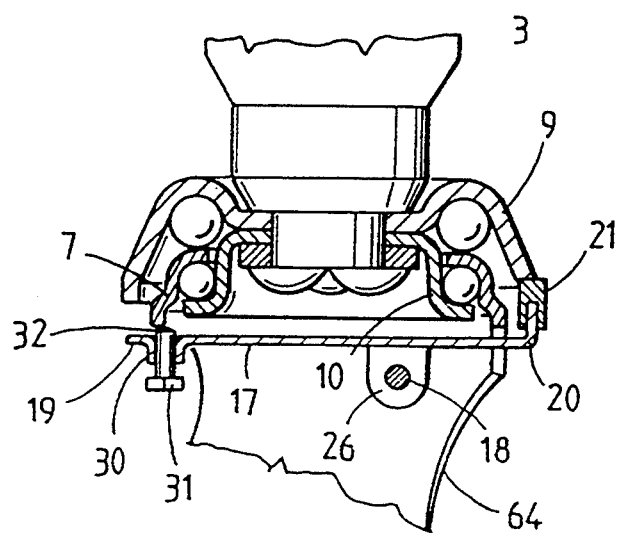
FIG. 6 is another variation of the embodiment of FIG. 1.

FIG. 6 shows locking means 16 similar to that of FIG. 1 in which the first end 19 of the spring strip 17 comprises a screw thread 30 receiving an adjusting screw 31, whereof the shank 32 bears against the lower edge of the skirt 7. This screw 31 makes it possible to adjust the pressure exerted by the locking bolt 21 in the recess 23 or against the free edge 22 of the cup 9 or 10.

Figure 7:
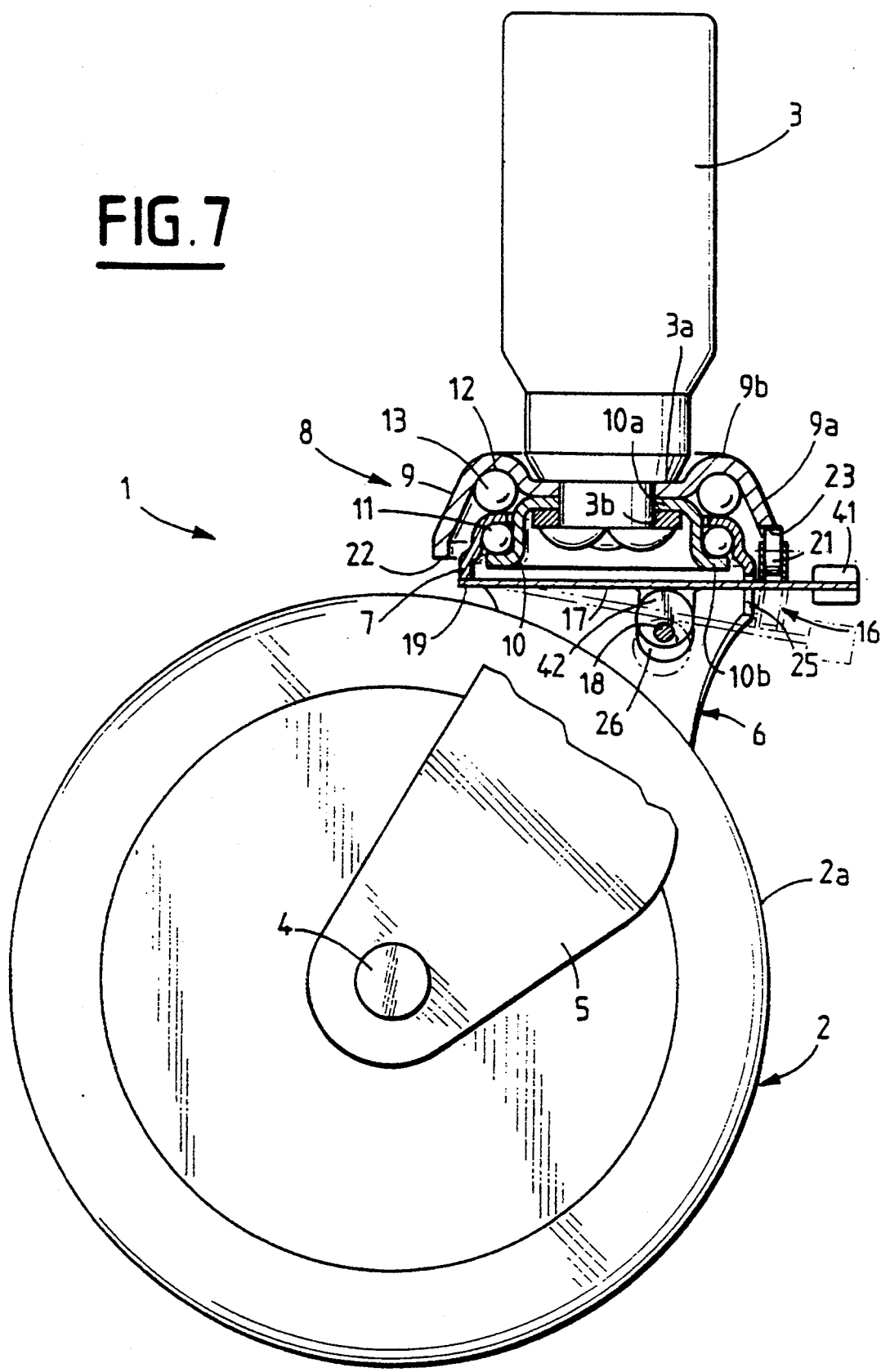
FIG. 7 shows another variation of the castor of FIG. 1.
Figure 8:
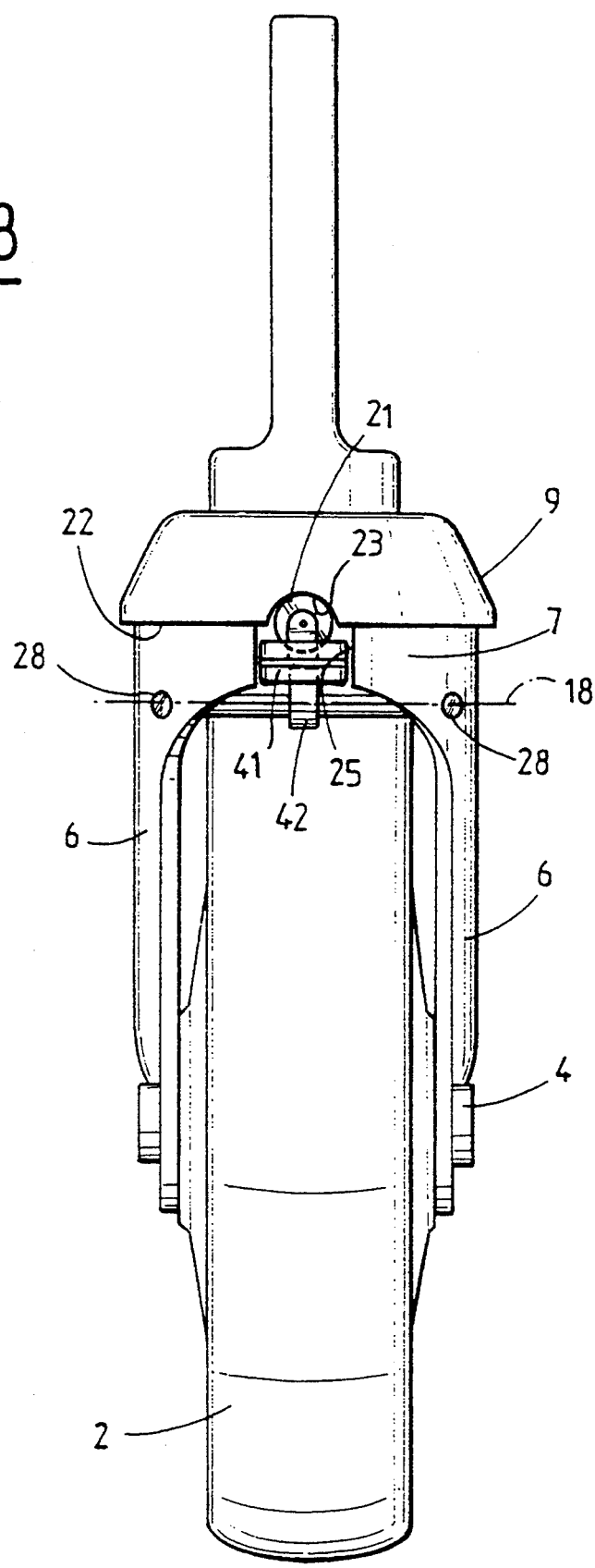
FIG. 8 is a rear view of the castor of FIG. 7.

FIGS. 7 and 8 show variations of the castor illustrated in FIG. 1. The locking bolt 21 is constituted by a roller according to that illustrated in FIG. 4E. The recess 23 has a semi-circular shape, which does not allow the automatic unlocking of the bolt 21. Accordingly, the spring strip 17 is provided at its end 20 with an unlocking lever or pedal 41, which is able to be operated by the user.

The pivot pin 18 furthermore comprises a cam 42 on which the spring strip 17 is pivoted. The pivot pin 18 is mounted to rotate on the fork joint 6 so that the spring strip 17 is able to adopt two extreme positions: a first position shown in full line in FIG. 7 in which the locking means are operative, the spring strip 17 bearing by its two ends 19, 20 respectively against the skirt 7 and the cup 9, and a second position, shown in broken line in FIG. 7, in which the locking means are inoperative, the roller 21 then being moved away from the cup 9.

We claim:

1. A pivoting castor pivoting about a pivot shaft (3) having a pivot axis and a lower end; said castor having a wheel (2) rotatively mounted on a rotation pin (4); said rotation pin (4) being fixed to a lateral member (5) of a support fork joint (6); said support fork joint (6) comprising a skirt (7) disposed around the lower end of said pivot shaft (3); said skirt (7) being mounted on said lower end of said pivot shaft (3) by means of a support bearing (8) for rotation in a direction about said pivot axis; said support bearing (8) comprising at least one annular cup (9, 10) having a first irregularity (23, 23') and said fork joint being provided with locking means (16) in the shape of a lever able to interact with said irregularity for locking the pivoting castor in a predetermined position, wherein said locking means (16) comprise an elongated substantially flat spring strip (17) having opposite first and second ends and a central part between said ends, said strip being pivoted by its central part on said support fork joint (6), said first end of said spring strip (17) bearing permanently on said skirt (7) and said second end (20) of said spring strip (17) carrying a locking element (21) for positioning in locking engagement with said irregularity (23, 23'); said locking element (21) having inclined surfaces facing in the direction of rotation of said skirt (7); said irregularity (23, 23') comprising inclined surfaces complimentary in shape to said inclined surfaces of said locking element (21) as to enable pivoting of the castor (2) to an unlocked position by exerting a torque or momentum on said castor for producing a relative rotation between said skirt (7) and said pivot shaft (3).

2. In a pivoting castor comprising a wheel (2) having a tread (2a), a rotation pin (4) on which the wheel (2) is mounted for rotation, a vertical pivot shaft (3) extending substantially at right angles to the rotation pin (4) of the wheel (2), a support bearing (8) disposed above said wheel (2) to define a space between said bearing (8) and said tread (2a) of said wheel, said bearing (8) comprising ball bearing elements (11, 13) and at least one annular cup (9, 10) having an annular surface with a downwardly facing annular free edge (22, 22') and a central part fixed to the lower end of said pivot shaft (3), a support fork joint (6) comprising at least one lateral member (5) having a lower end rotatably carrying said wheel (2) and an upper end, a skirt (7) connected to said upper end of said lateral member (5) and disposed around said lower end of the pivot shaft (3) in cooperating relation with said ball bearing elements (11, 13) of said bearing (8) for pivoting of said wheel (2) about said pivot shaft (3), said skirt (7) having a downwardly facing free skirt edge, and locking means (16) for locking the pivoting of said wheel (2) with respect to said pivot shaft (3) in at least one predetermined position, the improvement wherein:
  a) said at leasr one annular cup (9, 10) includes an irregularity (23, 23') in its surface; and
  b) said locking means (16):
    1) is disposed in said space between the support bearing (8) and the tread (2a) of the wheel (2),
    2) has opposite first and second ends (19, 20) and a central part disposed between said ends,
    3) is connected at a location spaced from said second end thereof to the fork joint (6),
    4) includes a locking bolt (21) on said second end for engaging with said irregularity (23, 23') provided in said at least one annular cup (9, 10) as said wheel (2) is pivoted about said pivot shaft (3) to said at least one predetermined position for locking the pivoting of said wheel about said pivot shaft (3) in said at least one predetermined position,
    5) includes a spring strip (17) comprising said opposite first and second ends (19, 20) and said central part disposed between said ends;
    6) said spring strip (17) is pivoted by its central part to said fork joint (6);
    7) said first end (19) of said spring strip (17) bears on said free skirt edge of said skirt (7); and
    8) said irregularity in said at least one annular cup (9, 10) is defined by a locking recess (23, 23') in said at least one annular cup (9, 10).

3. The castor according to claim 2, wherein said skirt (7) is disposed radially inwardly of said at least one annular cup (9) and includes means (25) for guiding the second end (20) of said spring strip (17) through said skirt and into underlying relation with said free edge of said at least one annular cup (9).

4. The castor according to claim 3, wherein said guide means (25) comprise a notch provided in the skirt edge of said skirt (7).

5. The castor according to claim 2, wherein said spring strip (17) is mounted on the fork joint (6) by means of a pivot pin (18) disposed parallel to the rotation pin (4) of the wheel (2).

6. The castor according to claim 2, wherein said spring strip (17) includes lateral tabs (26) having lugs (27) cooperating With openings provided in the fork joint (6) for pivoting of said spring strip (17) to said fork joint (6).

7. The castor according to claim 2, wherein the locking bolt (21) is an integral part of the spring strip (17).

8. The castor according to any one of claims 2 to 7, wherein said spring strip (17) includes at said second end (20) a pedal (41) allowing the manual unlocking of the pivoting of the wheel (2) about said pivot axis (3).

9. The castor according to claim 2, wherein the locking bolt (21) is urged under a predetermined force by the spring strip (17) against said free edge (22) of said at least one annular cup (9, 10), and said locking recess (23) is provided in said free edge (22).

10. The castor according to claim 9, wherein said recess (23, 23') comprises inclined ramps (24) in order to allow the unlocking of the pivoting of the wheel (2) by a rotary torque exerted on the fork joint (6) or the pivot shaft (3).

11. The castor according to claim 9, wherein the locking means includes means (31) for adjusting the position of the spring strip (17) to adjust the force by which the locking bolt (21) is urged against the free edge (22) of said at least one annular cup (9, 10).

12. The castor according to claim 11, wherein the means for adjusting said force includes an adjusting screw (31) connected to said first end (19) of said spring strip (17) and engaging with the skirt edge of said skirt (7).

13. The castor according to claim 9, wherein a pivot pin (18) is rotatably mounted on said fork joint (6) and includes at least one cam (42) rotatable therewith for moving said spring strip (17) between an operative position with said locking bolt (21) engaging against said at least one annular cup (9, 10) and an inoperative position with the locking bolt (21) out of engagement with said at least one annular cup (9, 10).

* * * * *